(12) United States Patent
Ito

(10) Patent No.: US 7,748,188 B2
(45) Date of Patent: Jul. 6, 2010

(54) MEMBER AND STRUCTURE FOR FASTENING EXTERIOR PANEL

(75) Inventor: Tsuneaki Ito, Kuwana (JP)

(73) Assignee: Nichiha Co., Ltd, Nagoya-shi (JP)

( * ) Notice: Subject to any disclaimer, the term of this patent is extended or adjusted under 35 U.S.C. 154(b) by 608 days.

(21) Appl. No.: 11/376,568

(22) Filed: Mar. 16, 2006

(65) Prior Publication Data
US 2006/0272261 A1 Dec. 7, 2006

(30) Foreign Application Priority Data
Mar. 22, 2005 (JP) .............................. 2005-082144

(51) Int. Cl.
 E04B 2/00 (2006.01)
 E04B 5/00 (2006.01)
 E04B 9/00 (2006.01)
 E04D 1/00 (2006.01)
 E04D 1/34 (2006.01)

(52) U.S. Cl. .................. 52/506.06; 52/506.05; 52/520; 52/543; 403/381

(58) Field of Classification Search ................... 52/543, 52/506.06, 520, 506.05, 506.01, 518; 248/223.41, 248/220.22; 403/381
See application file for complete search history.

(56) References Cited

U.S. PATENT DOCUMENTS

| | | | | |
|---|---|---|---|---|
| 2,972,543 A | * | 2/1961 | Beals et al. | 501/18 |
| 3,348,996 A | * | 10/1967 | Cadotte | 162/114 |
| 6,266,937 B1 | * | 7/2001 | Watanabe | 52/489.2 |
| 6,315,489 B1 | * | 11/2001 | Watanabe | 403/381 |
| 6,402,419 B1 | * | 6/2002 | Watanabe | 403/381 |
| 6,499,261 B2 | * | 12/2002 | Hikai | 52/235 |
| 6,598,362 B2 | * | 7/2003 | Hikai | 52/235 |
| 6,609,342 B2 | * | 8/2003 | Hikai | 52/506.01 |
| 6,615,560 B2 | * | 9/2003 | Ito | 52/506.06 |
| 6,637,170 B2 | * | 10/2003 | Ito | 52/506.06 |
| 6,830,405 B2 | * | 12/2004 | Watanabe | 403/14 |
| 6,843,032 B2 | * | 1/2005 | Hikai | 52/287.1 |
| 7,311,965 B2 | * | 12/2007 | Hojaji et al. | 428/318.8 |
| 2005/0019542 A1 | * | 1/2005 | Hojaji et al. | 428/304.4 |

FOREIGN PATENT DOCUMENTS

| | | |
|---|---|---|
| JP | 9-302889 | 11/1997 |
| JP | 2001-027031 | 1/2001 |

* cited by examiner

*Primary Examiner*—Richard E Chilcot, Jr.
*Assistant Examiner*—Andrew J Triggs
(74) *Attorney, Agent, or Firm*—Edwards Angell Palmer & Dodge LLP

(57) ABSTRACT

The present invention is a fastening member formed of a single steel plate for fastening exterior panels to a building frame and a structure using the fastening member. The fastening member includes, a base plate portion functioning as a fastening portion to a building frame side, a central supporting portion to be in contact with the rear surface of an upper exterior panel at the time of the fastening, and an engaging portion extended from a lower end of the central supporting portion, the engaging portion being configured to be engaged with upper and lower ends of exterior panels at the time of the fastening. Between an upwardly extended portion and a downwardly extended portion constituting the engaging portion, a cutout for decreasing the rigidity of the engaging portion is formed.

16 Claims, 7 Drawing Sheets

MEMBER AND STRUCTURE FOR FASTENING EXTERIOR PANEL

This application claims priority under 35 U.S.C. §119 to Japanese Patent Application No. 2005-082144 filed on Mar. 22, 2005, the entire disclosure of which is incorporated herein by reference in its entirety.

BACKGROUND OF THE INVENTION

1. Field of the Invention

The present invention relates to a fastening member for fastening exterior panels to a building frame and an exterior panel fastening structure using the fastening member.

2. Description of the Related Art

The following description sets forth the inventor's knowledge of related art and problems therein and should not be construed as an admission of knowledge in the prior art.

In constructing exterior panels of a building, exterior panels 40 each having at least shiplap portions 44 and 42 at upper and lower edges thereof as shown in FIG. 6 are fastened to a building frame side using fastening members (see Japanese Unexamined Laid-open Patent Publication No. 2001-27031 (hereinafter "Patent Document 1")). FIG. 7 shows a fastening member disclosed in Patent Document 1. This fastening member 50 is formed by bending a single steel plate, and includes supporting portions 51a and 51b for supporting rear surfaces of exterior panels at the time of fastening the panels, an engaging portion 52 formed by bending the central portion of the supporting portion 51, a base plate portion 53 extending from the upper edge of the upper supporting portion 51a, and a bend portion 54 extending from the lower edge of the lower supporting portion 51b. At the time of fastening the fastening member 50 to a building frame side, the base plate portion 53 and the tip end of the bend portion 54 function as fastening portions.

At the time of the construction, an upper exterior panel is fastened in a state in which the shiplap portion 42 formed at the lower edge of the panel is engaged with the engaging portion 52 with the rear surface in contact with the supporting portion 51a. In the same manner, a lower exterior panel is fastened in a state in which the shiplap portion 44 formed at the upper edge of the panel is engaged with the engaging portion 52 with the rear surface in contact with the supporting portion 51b. This fastening member 50 has a concave portion 61, formed at supporting portion 51a, reaching the building frame side to stabilize the fastened state of the fastening member 50 to a building frame side. In the fastened state, a space corresponding to the level difference between the surface of the base plate portion 53 and that of the supporting portion 51 is formed between the rear surface of the exterior panel and the building frame, thereby securing ventilation.

Japanese Unexamined Laid-open Patent Publication No. H09-302889 (hereinafter, "Patent Document 2") discloses a fastening member 70 which is also formed by bending a single steel plate as shown in FIG. 8. This fastening member 70 is provided with a base plate portion 71, supporting portions 72 and 72 forwardly protruded from right and left side end portions of the base plate portion 71 and extending in the up-and-down direction, and an engaging portion 73 formed between the right and left supporting portions 72 and 72 so as to extend in the right and left direction with a tip end positioned forward with respect to the supporting portions 72 and 72. This engaging portion 73 is formed by bending the lower region of the base plate 71, and is provided with upwardly extended portions 75 and 75 formed by upwardly bending a tip end of both side portions and a downwardly extended portion 76 formed by downwardly bending a central portion of the tip end. The upper exterior panel is fastened in the state in which the lower end shiplap portion 42 is engaged with the engaging portion 73 and the rear surface of the panel is in contact with the supporting portions 72 and 72. In the same manner, the lower exterior panel is fastened in the state in which the upper end shiplap portion 44 is engaged with the engaging portion 73 and the rear surface of the panel is in contact with the supporting portions 72 and 72. In the fastened state, ventilation is secured since a space corresponding to the height of the supporting portion 72 and 72 is formed between the rear surface of the exterior panel and the building frame.

The fastening member 50 shown in FIG. 7 was relatively heavy and required a large amount of steel due to the engaging portion 52 formed by folding a steel plate in a laminated matter, resulting in high costs.

On the other hand, in the fastening member 70 shown in FIG. 8, the engaging portion 73 is a single plate structure, resulting in light weight and low costs. However, since the engaging portion 73 is extended from the base plate portion 71 as a fastening portion to a building frame side, as compared with the structure in which the engaging portion 52 is protruded from the supporting portion 51 as shown in FIG. 7, the strength of the engaging portion 73 was not sufficient especially in the case of fastening large and heavy exterior panels.

Furthermore, in the fastening member 70, since it is configured to support the rear surface of an exterior panel only by the right and left supporting portions 72 and 72, especially in cases where two adjacently arranged exterior panels are fastened with only one fastening member 70, the rear surface of each exterior panel is supported by one of the right and left supporting portions 72, resulting in deterioration of the fastening stability.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a fastening member with an engaging portion having sufficient strength made of a single steel plate capable of being produced using small amount of steel, attaining weight saving and low cost and stably supporting exterior panels.

Among other potential advantages, some embodiments can provide a safe and secure exterior panel fastening structure using the fastening member.

According to one aspect of some embodiments of the present invention, a fastening member for fastening exterior panels, comprises:

left and right side supporting portions configured to be brought into contact with a rear surface of an upper exterior panel at the time of fastening the exterior panels;

a base plate portion located at an intermediate region between the left and right side supporting portions, the base plate portion functioning as a fastening portion to a building frame side;

a central supporting portion configured to be brought into contact with the rear surface of the upper exterior panel at the time of fastening the upper exterior panel, the central supporting portion being located below the base plate portion;

an engaging portion extended from a lower end of the central supporting portion, the engaging portion being configured to be engaged with upper and lower ends of upper and lower exterior panels at the time of fastening the exterior panels; and a lower side supporting portion configured to be brought into contact with a rear surface of a lower exterior panel at the time of fastening the lower exterior panel, the lower side supporting portion being located below the engaging portion, wherein the fastening member is formed of a single steel plate, wherein the base plate portion is formed by rearwardly denting a part of an upper region of the steel plate, wherein the engaging portion is formed by cutting a part of a lower region of the steel plate and bending the cut portion frontward, and is provided with at least one cutout extending from a basal end of the engaging portion or its vicinity to a tip end of the engaging portion, and wherein an upwardly extended portion is formed at a tip end of the engaging portion at one side of the cutout and a downwardly extended portion is formed at a tip end of the engaging portion at the other side of the cutout.

With this fastening member, since the engaging portion is formed by cutting a part of a steel plate as a material, the fastening member is a single plate structure. Thus, as compared to the conventional fastening member as shown in FIG. 7, the weight and cost can be decreased. Furthermore, since the engaging portion is protruded from the supporting portion, as compared to the conventional fastening member as shown in FIG. 8 in which the engaging portion 73 is protruded from the base plate portion 71, the length of the engaging portion can be shorter, resulting in sufficient strength regardless of the single plate structure of the engaging portion.

Furthermore, since the fastening member is configured to support the rear surfaces of the exterior panels with supporting portions positioned above and below the engaging portion, as compared to the conventional fastening member 70 shown in FIG. 8 in which the rear surfaces of the exterior panels are supported only by the right and left supporting portions, the rear surfaces of the exterior panels can be supported assuredly. Especially, even in cases where the lower ends of the adjacently arranged right and left exterior panels are fastened with a single fastening member, each exterior panel can be supported at two portions, i.e., either the right supporting portion or the left supporting portion and the central supporting portion, resulting in stable fastening of exterior panels.

The engaging portion has at least one cutout extending from the basal end of the engaging portion or its vicinity to the tip end of the engaging portion. The upwardly extended portion is formed by bending the one side end of the engaging portion and the downwardly extended portion is formed by bending the other side end of the engaging portion. An upper exterior panel can be assuredly engaged with the upwardly extended potion and a lower exterior panel can be assuredly engaged with the downwardly extended portion. By setting the length of the cutout so as to extend from the basal end of the engaging portion or its vicinity to the tip end of the engaging portion, as compared to the case in which a cutout is formed from the basal end of the downwardly extended portion (or upwardly extended portion) of the engaging portion or its vicinity to the tip end of the engaging portion, the rigidity of the engaging portion for engaging an upper exterior panel (or lower exterior panel) can be decreased as large as possible. Decreasing the rigidity of the engaging portion can prevent breakage of the shiplap portion of the exterior panel engaged with the fastening member due to a large load partially applied to the shiplap portion when the exterior panel received a wind pressure from the rear surface. This is because the engaging portion small in rigidity can deform in accordance with the load even in cases where a large load is partially applied to the shiplap portion of the exterior panel engaged with the engaging portion.

It is preferable that the cutout further extends from the basal end of the engaging portion or its vicinity to the base plate portion.

In this structure, the rigidity of the engaging portion can be further decreased. The adjustment of the length of the cutout should be performed so as to secure a minimum rigidity required to fasten exterior panels while assuredly preventing breakage of the shiplap portion of the exterior panel. Accordingly, it is preferable to adjust the length taking into consideration of these two factors and the weight or material of the exterior panel. In the fastening member having a relatively long cutout, it is preferably used to fasten a relatively light exterior panel.

It is preferable that the downwardly extended portion is formed by downwardly bending a tip end of the engaging portion bent by about 90° with respect to the base plate portion by about °80 to about 90°.

In cases where the bent angle of the tip end of the engaging portion is moderate, i.e., the angle between the horizontal portion of the engaging portion and the downwardly extended portion is an obtuse angle, the fastening operation of a shiplap portion of a lower exterior panel to the fastening member can be performed easily. However, since the engaging of the exterior panel by the downwardly extended portion becomes looser, it is preferable to bend the downwardly extended portion so that the angle comes near 90°. Accordingly, by setting the bending angle of the downwardly extended portion with respect to the horizontal surface of the engaging portion to about 80° to about 90°, assured engagement of the exterior panel can be secured.

It is preferable that at least one of the left side supporting portion, the right side supporting portion and the lower side supporting portion is provided with a flange portion outwardly extending from its external edge. In this case, the flange portion comes into contact with the building frame side in addition to the base plate portion, resulting in more stable fastening of the fastening member to the building frame side.

According to another aspect of some embodiments of the present invention, an exterior panel fastening structure, comprises:

a plurality of any one of the aforementioned fastening members fixed to a fixing surface of a building frame side in multiple stages;

a plurality of exterior panels fastened using the fastening members in a state in which a rear surface of an upper exterior panel is in contact with the left supporting portion, the central supporting portion and the right supporting portion with a lower shiplap portion of a lower edge portion of the upper exterior panel engaged with the engaging portion of the fastening member positioned below the upper exterior panel and a rear surface of a lower exterior panel is in contact with the lower supporting portion with an upper shiplap portion of an upper edge portion of the lower exterior panel engaged with the engaging portion of the fastening member positioned above the lower exterior panel.

With this exterior panel fastening structure, since the weight and cost of the fastening member is reduced, the construction costs can be decreased and assured fastening can be attained. Furthermore, since a ventilation space is formed at the rear side of the fastened exterior panels, it is possible to avoid occurrence of inconveniences such as dew formation. Furthermore, as mentioned above, since the cutout of an appropriate length is formed in the engaging portion, it is possible to solve such problems as breakage of the shiplap portion of the exterior panel due to the wind pressure applied to the exterior panel while keeping the minimum rigidity for fastening the exterior panel.

It is preferable that the exterior panel is made of burned or fired material.

As the exterior panel, a wood chip cement board as a ceramic series exterior panel has been generally used. In view of the recent increased requirement of longer durability of the exterior panel and the limit of the performance of the cement coated panel, it is considered to use an exterior panel made of burned material.

As the exterior panel made of burned material, a tiled exterior wall can be exemplified and it is well known that it is high in durability. As one of exterior panel fastening structures, it is known to fasten an exterior panel made of burned material with a fastening member fixed to a furring strip with screws. With this structure, exterior panels high in durability can be fastened above and below the fastening member while fixing the fastening member to the furring strip with screws high in fixing strength as compared to a nail. In the fastening member, since rigidity of the engaging portion is decreased by the cutout of a certain length, the wind load exerted to the exterior panel can be effectively decreased at the engaging potion. Thus, durability can be enhanced not only by the material of the exterior panel, but also by the exterior panel fastening structure.

EFFECTS OF THE INVENTION

The fastening member according to the present invention can assuredly support an exterior panel with the engaging portion and the supporting portions regardless of its lightweight and low cost due to the single plate structure. Thus, with the exterior panel fastening structure, the fastening of exterior panels can be kept stably for a long period of time.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described with reference to the attached drawings by way of example and not limitation. It should be understood based on this disclosure that various other modifications can be made by those in the art based on these illustrated embodiments.

Figure 1:
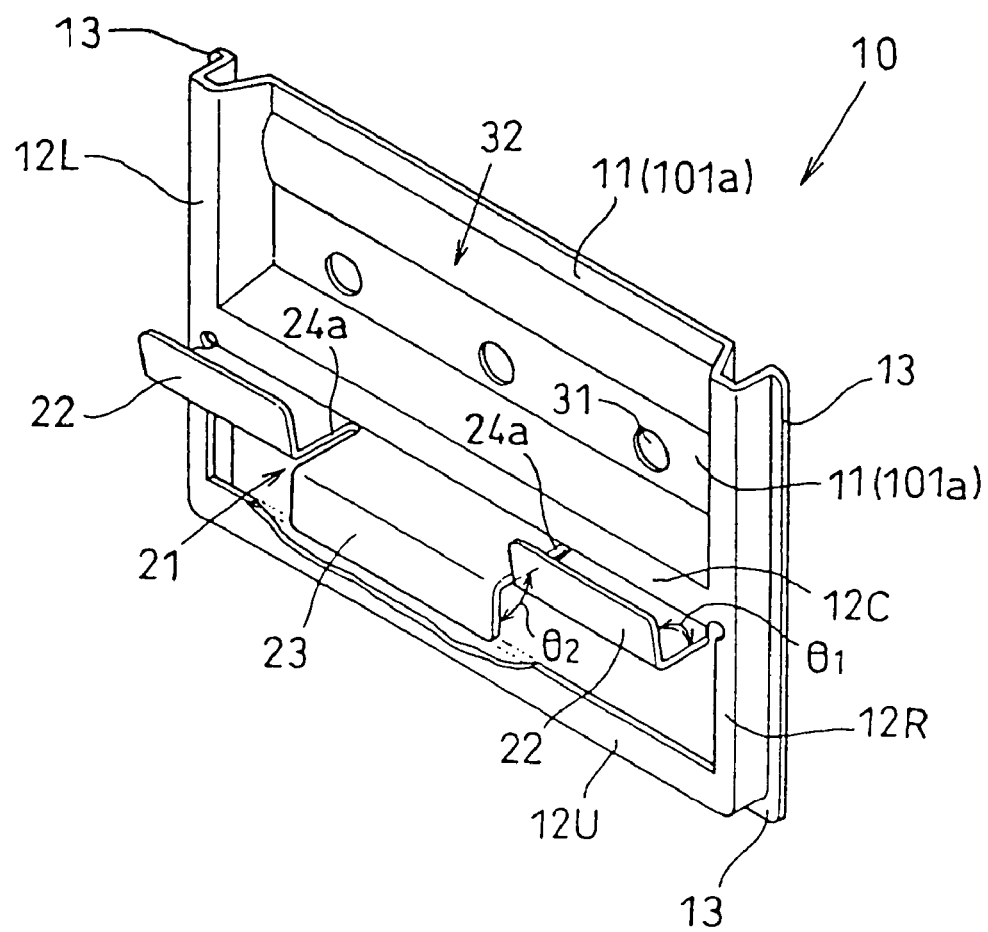
FIG. 1 is a perspective view showing a fastening member according to an embodiment of the present invention.
Figure 3:
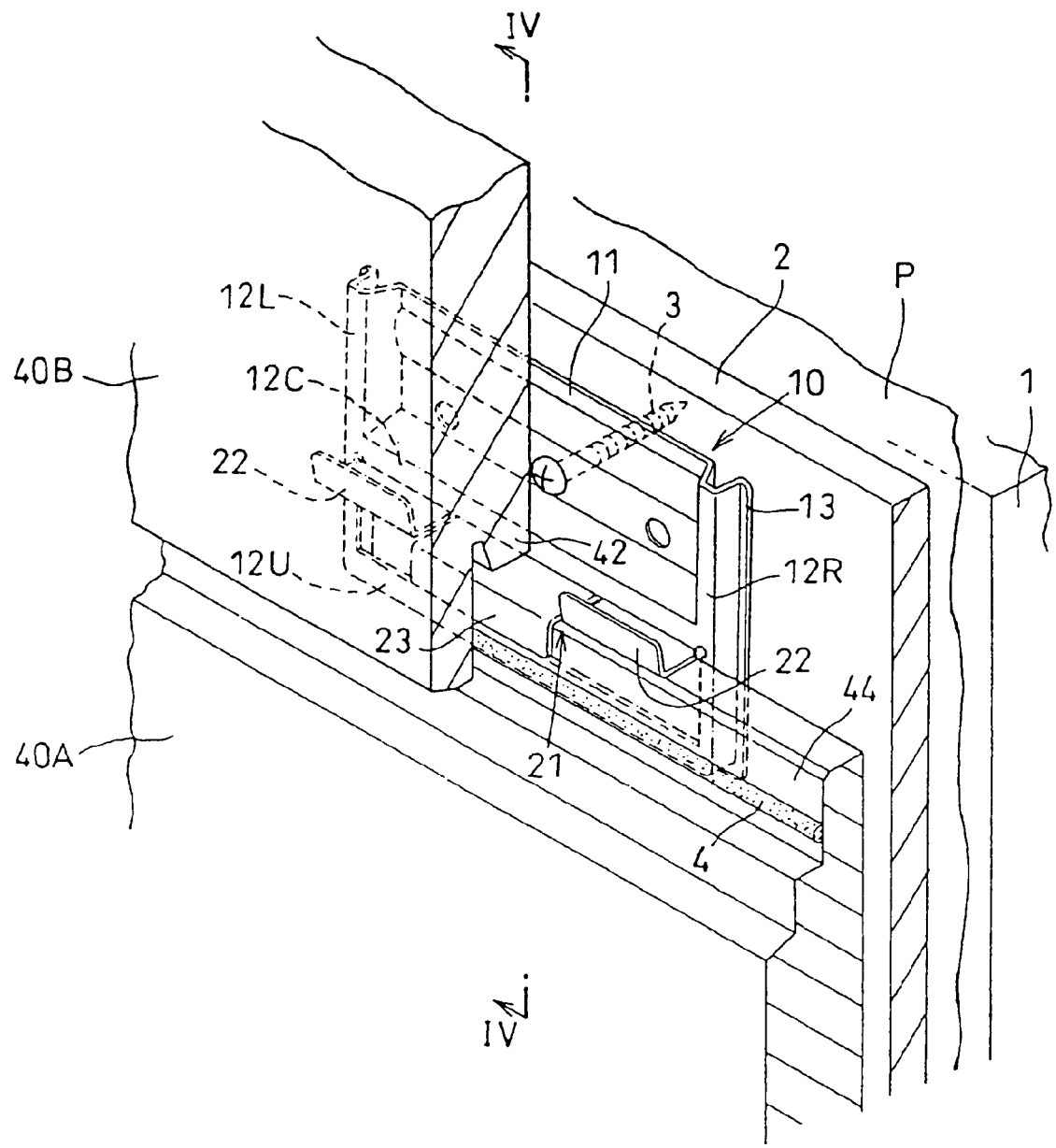
FIG. 3 is a perspective view showing the state in which exterior panels are fastened to a building frame using the fastening member shown in FIG. 1.

FIG. 1 is a perspective view showing a fastening member according to an embodiment of the present invention, and FIG. 3 is a perspective view showing an exterior panel fastening structure using the fastening member shown in FIG. 1.

The fastening member 10 shown in FIG. 1 has, at its right and left side portions, a left side supporting portion 12L and a right side supporting portion 12R, respectively, which come into contact with the rear surface of an exterior panel at the time of fastening the panel to a building frame. The parts that come into contact with the backside of the upper exterior panel are 12C, the portion of 12L located above 12C and the portion of 12R located above 12C. At the intermediate region between the left side supporting portion 12L and the right side supporting portion 12R, a base plate portion 11 functioning as a fastening portion to a building frame side, a central supporting portion 12C which comes into contact with a rear surface of an exterior panel at the time of fastening the panel, an engaging portion 21 for engaging upper and lower ends of exterior panels at the time of the fastening, and a lower side supporting portion 12U which comes into contact with a rear surface of an exterior panel at the time of fastening the panel. The parts that contact the lower exterior panel are 12U, the portion of 12L that is located below 12C and the portion of 12R that is located below 12C.

Figure 2:
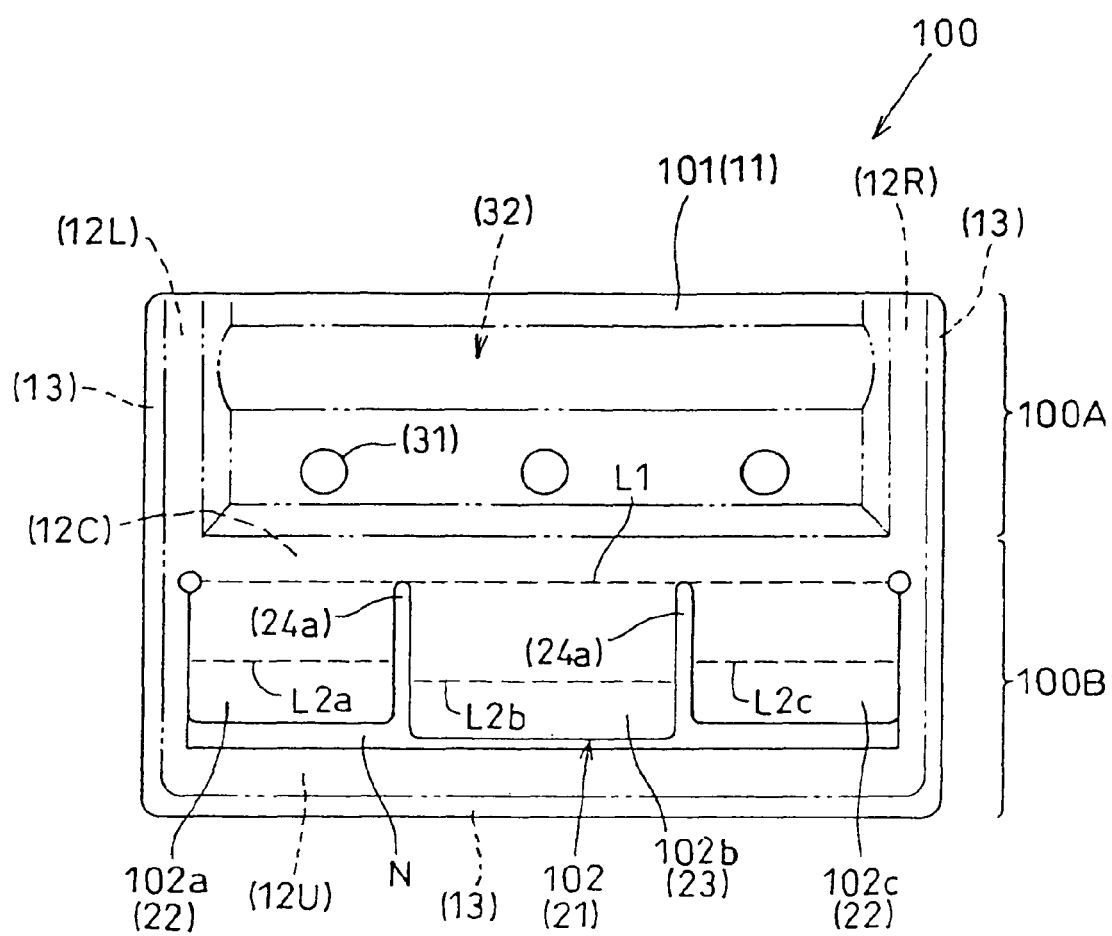
FIG. 2 is a plan view showing a steel plate as a material of the fastening member shown in FIG. 1.

The fastening member 10 is produced from a single steel plate such as a stainless steel plate or an alloy plated steel plate through blanking, drawing and bending processing. FIG. 2 shows a steel plate 100 as a material of the fastening member 10. The thickness of the steel plate 100 is set to about 1.0 mm. By using such a somewhat thick steel 100, the rigidity of the fastening member 100 is secured. In FIG. 2, the reference numerals of the fastening member 10 shown in FIG. 1 are allotted to the corresponding portions of the steel plate shown in FIG. 2 to show the positional relationship thereof.

Now, an example of the production method of the fastening member 10 will be explained. Initially, a steel plate 100 having fixing screw holes 31 and a cutout N as shown in FIG. 2 is obtained by blanking. The cutout N is formed into a generally U-shape in the lower region 100B. The portion surrounded by this cutout N defines an extended potion 102 which will become the engaging portion 21 of the fastening member 10 after the processing. The extended portion 102 includes, at its tip end, three protruded portions 102a, 102b and 102c which will become the upwardly extended portion 22 or the downwardly extended portion 23 of the engaging portion 21 after the processing. Each of the cutout 24a formed between the protruded portion 102a and the protruded portion 102b and the cutout 24a formed between the protruded portion 102b and the protruded portion 102c has a length from the tip end of the protruded portion 24a to the basal end thereof.

Next, drawing processing is executed to the steel plate 100 along the two-dot chain lines as shown in FIG. 2 to partially raise to thereby form the left side supporting portion 12L at the left side, the right side supporting portion 12R at the right side, the central supporting portion 12C and the lower side supporting portion 12U at the lower region 100B. As a result, at the central portion 101 in the upper region 100A of the steel plate 100, a base plate portion 11 dented rearward by several millimeters is formed. Furthermore, a flange portion 13 is formed at each of the outer side edge portions of the left, right and lower side supporting portions 12L, 12R and 12U. At the time of the drawing processing, a raising portion 32 is also formed. Additional strengthening ribs (not shown) can be formed.

Thereafter, the extended portion 102 previously formed in the lower region 100B of the steel plate 100 is bent perpendicularly toward the surface side along the upper side (broken line L1 shown in FIG. 2), and the left and right protruded portions 102a and 102c of the tip ends of the extended portion 102 are bent obliquely upward along the broken lines L2a and L2c shown in FIG. 2 to thereby form the upwardly extended portions 22 and 22. Furthermore, the central protruded portion 102b of the tip end of the extended portion 102 is bent obliquely downward along the broken line L2b shown in FIG. 2 to thereby form the downwardly extended portion 23. For example, the bending angle $\theta 1$ (see FIG. 1) of the upwardly extended portion 22 can be set to about 100°, and the bending angle $\theta 2$ (see FIG. 1) of the downwardly extended portion 23 can be set to about 80° to about 90°. Thus, the engaging portion 21 is formed to have configurations corresponding to the shiplap portions of the upper and lower end of the exterior panel 40 to be fastened.

Figure 4:
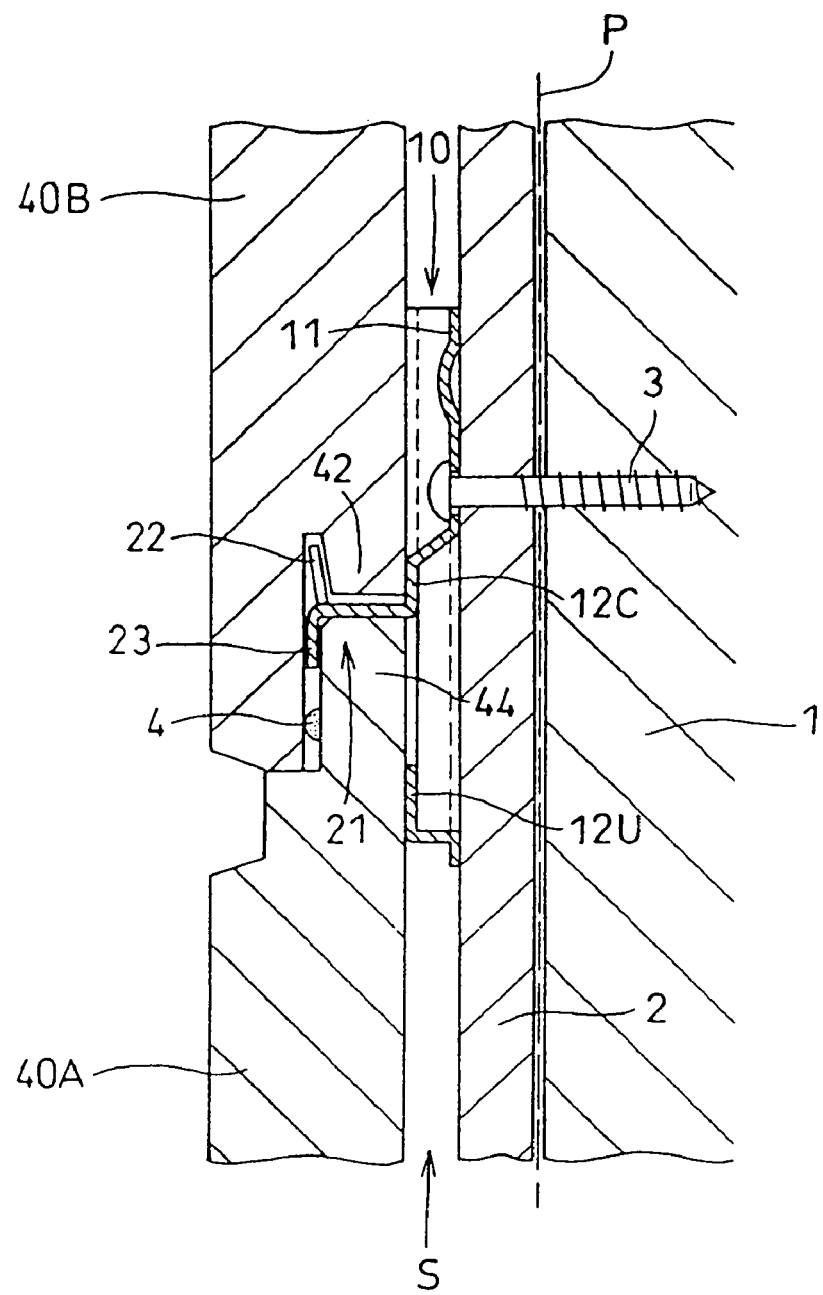
FIG. 4 is a cross-sectional view taken along the line IV-IV in FIG. 3.
Figure 6:
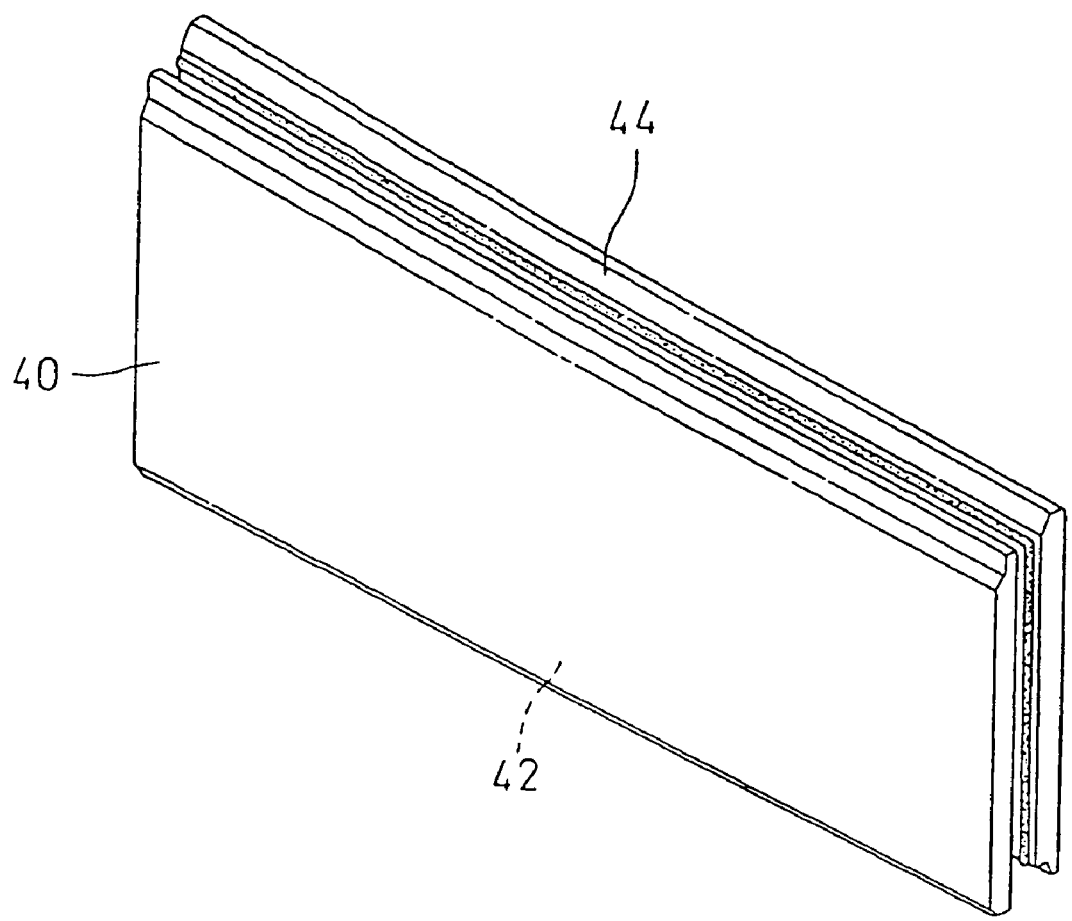
FIG. 6 is a perspective view showing an example of an exterior panel.
Figure 7:
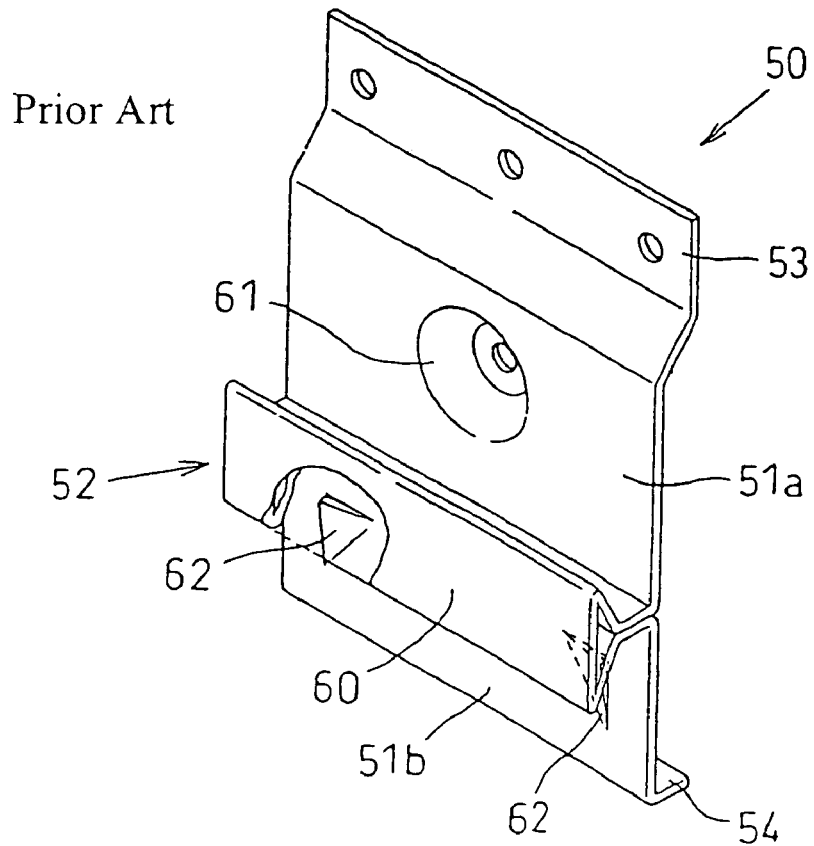
FIG. 7 is a perspective view showing an example of a conventional fastening member.
Figure 8:
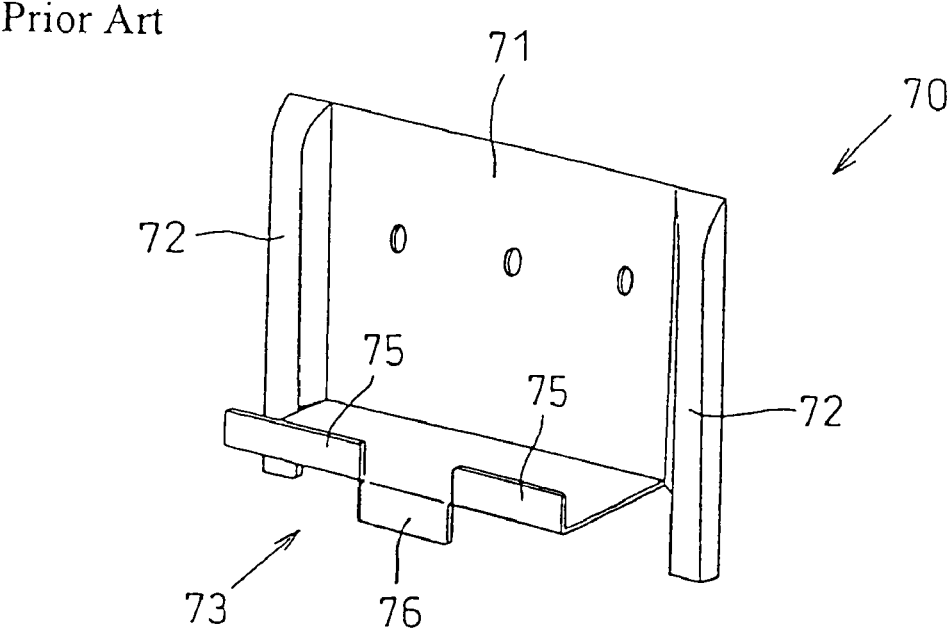
FIG. 8 is a perspective view showing another example of a conventional fastening member.

Next, the exterior panel fastening structure using the aforementioned fastening member will be explained. FIG. 3 shows the state in which the exterior panels 40A and 40B shown in FIG. 6 are fastened using the aforementioned fastening member 10. FIG. 4 is a cross-sectional view taken along the line IV-IV in FIG. 3. In this illustrated embodiment, the fastening member 10 is fixed to the building frame 1 via the furring strip 2 and the sheathing paper P with screws 3 utilizing the screw holes 31 formed in the base plate portion 11. At this time, the fastening member 10 is positioned by outwardly engaging the engaging portion 21 with the shiplap portion 44 of the upper end edge of the lower exterior panel 40A, and fastened utilizing the screw holes 31 while keeping the positioned state. At around the basal end portion of the shiplap portion 44 formed at the upper end edge of the lower exterior panel 40A, caulking material 4 is applied to prevent water leakage.

After fastening a predetermined number of the fastening members 10 at certain intervals in the horizontal direction, a predetermined number of upper exterior panels 40B are arranged with the lower shiplap portions 42 inwardly engaged with the engaging portions 22 of the fastening members 10. Using the upper exterior panels 40B arranged as mentioned above as lower exterior panels, another fastening members 10 are fastened with the engaging portions 23 engaged with the upper shiplap portions 44 using screws 3 in the same manner as mentioned above. By repeating the aforementioned steps as required, the exterior panel fastening structure can be completed.

In the aforementioned exterior panel fastening structure, each exterior panel 40 can be stably supported by the engaging portion 21 and each supporting portion 12L, 12R, 12C and 12U of the fastening member 10. Furthermore, since a space S is formed between the rear surface of the exterior panel 40 and the furring strip 2 by each supporting portion 12L, 12R, 12C and 12U, ventilation at the rear side of the exterior panel 40 can be secured, thereby preventing the formation of any condensation. Furthermore, with the exterior panel fastening structure according to the present invention, regardless of the light weight of the fastening member, excellent strength can be exhibited, and a long term stable fastening can be attained. As the exterior panel, an exterior panel made of burned material such as ceramic can be preferably used.

In brief, the downwardly extended portion 23 latched together with the upper portion of the lower exterior panel is separated as left and right upwardly extended portion 22. The bend angle of downwardly extended portion 23 is 80-90 degrees, which is distinguished from the bend angle of upwardly extended portion 22.

Downwardly extended portion 23 functions to reduce saccadic movements among exterior panels by pressing multiple lower external panels, where the multiple exterior panels are already attached beneath the downwardly extended portion 23. The bend angle is less than 90 degrees to fix the lower exterior panels firmly.

The separated lower exterior panel works extremely well when the outer wall panel is hard. Because the latch portion is apart, it supports wind pressures from the upper side of the wall panel and the lower side of the wall panel separately. It will fortify wind pressure resistance.

Figure 5:
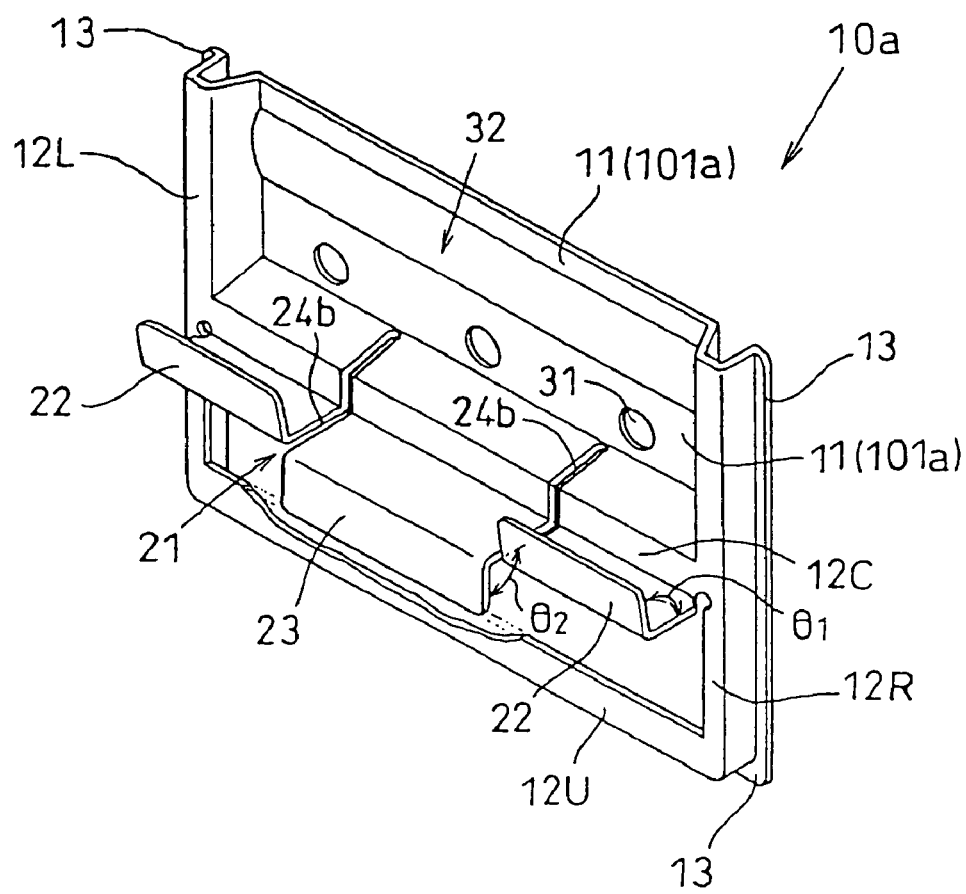
FIG. 5 is a perspective view showing a fastening member according to another embodiment of the present invention.

FIG. 5 is a perspective view showing a fastening member according to another embodiment of the present invention. In this fastening member 10a, each cutout 24b formed between the upwardly extended portion 22 and the downwardly extended portion 23 extends to the base plate portion 11. As compared to the embodiment shown in FIG. 1, the rigidity of the engaging portion is decreased due to the extended cutout 24b, resulting in enhanced deforming performance with respect to the exterior panel to which an external force is applied. In this fastening member 10a, it is also preferable that the angle $\theta 1$ is set to about 100° and the angle $\theta 2$ is set to about 80° to about 90°

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A fastening member for fastening exterior panels, comprising:
    raised left and fight side supporting portions having at least a raised side wall perpendicular to a front face of the fastening member, raised relative to an indented base plate portion, configured to be brought into contact with a rear surface of an upper exterior panel at the time of fastening the exterior panels;
    the indented base plate portion located at an intermediate region between the raised left and fight side supporting portions and indented relative to the raised left and right side supporting portions, the indented base plate portion functioning as a fastening portion to a building frame side;
    a raised central supporting portion, raised relative to the indented base plate portion, configured to be brought into contact with the rear surface of the upper exterior panel at the time of fastening the upper exterior panel, the raised central supporting portion being located between the raised left and right side supporting portions and on one side of the indented base plate portion;
    an engaging portion extended from a lower end of the raised central supporting portion, the engaging portion being configured to be engaged with upper and lower ends of upper and lower exterior panels at the time of fastening the exterior panels; and
    a raised lower side supporting portion having at least a raised side wall perpendicular to the front face, raised relative to the indented base plate portion, configured to be brought into contact with a rear surface of a lower exterior panel at the time of fastening the lower exterior panel, the raised lower side supporting portion being located below the engaging portion,
    wherein the raised left, fight, central and lower supporting portions define ridges connected in the center and lower part of the fastening member forming an unbroken surface connecting tops of the raised left, fight, central and lower supporting portions;
    wherein the fastening member is formed of a single steel plate,
    wherein the base plate portion is formed by denting the intermediate region of the steel plate between the raised left and right side supporting portions,
    wherein the engaging portion is formed by cutting a part of a lower region of the steel plate and bending the cut portion frontward, and is provided with at least one cutout extending from a basal end of the engaging portion or its vicinity to a tip end of the engaging portion, and
    wherein an upwardly extended portion is formed at a tip end of the engaging portion at one side of the cutout and a downwardly extended portion is formed at a tip end of the engaging portion at the other side of the cutout.

2. The fastening member as recited in claim 1, wherein the cutout further extends from the basal end of the engaging portion or its vicinity to the base plate portion.

3. The fastening member as recited in claim 1, wherein the downwardly extended portion is formed by downwardly bending a tip end of the engaging portion with respect to the base plate portion by about 80° to about 90°.

4. The fastening member as recited in claim 1, wherein at least one of the raised left side supporting portion, the raised right side supporting portion and the raised lower side supporting portion is provided with a flange portion outwardly extending from a lower edge of an outer side portion which is not raised relative to the base plate portion.

5. An exterior panel fastening structure, comprising:
    a plurality of fastening members as recited in claim 1 fixed to a fixing surface of a building frame side in multiple stages;
    a plurality of exterior panels fastened using the fastening members in a state in which a rear surface of an upper exterior panel is in contact with the left supporting portion, the central supporting portion and the right supporting portion with a lower shiplap portion of a lower edge portion of the upper exterior panel engaged with the engaging portion of the fastening member positioned below the upper exterior panel and a rear surface of a lower exterior panel is in contact with the lower supporting portion with an upper shiplap portion of an upper edge portion of the lower exterior panel engaged with the engaging portion of the fastening member positioned above the lower exterior panel.

6. The exterior panel fastening structure as recited in claim 5, wherein each of the exterior panels is made of burned material.

7. The fastening member as recited in claim 2, wherein the downwardly extended portion is formed by downwardly bending a tip end of the engaging portion with respect to the base plate portion by about 80° to about 90°.

8. The fastening member as recited in claim 2, wherein at least one of the raised left side supporting portion, the raised right side supporting portion and the raised lower side supporting portion is provided with a flange portion outwardly extending from a lower edge of an outer side portion which is not raised relative to the base plate portion.

9. The fastening member as recited in claim 3, wherein at least one of the raised left side supporting portion, the raised right side supporting portion and the raised lower side supporting portion is provided with a flange portion outwardly extending from a lower edge of an outer side portion which is not raised relative to the base plate portion.

10. The fastening member as recited in claim 7, wherein at least one of the raised left side supporting portion, the raised right side supporting portion and the raised lower side supporting portion is provided with a flange portion outwardly extending from a lower edge of an outer side portion which is not raised relative to the base plate portion.

11. An exterior panel fastening structure, comprising:
a plurality of fastening members as recited in claim 2 fixed to a fixing surface of a building frame side in multiple stages;
a plurality of exterior panels fastened using the fastening members in a state in which a rear surface of an upper exterior panel is in contact with the left supporting portion, the central supporting portion and the right supporting portion with a lower shiplap portion of a lower edge portion of the upper exterior panel engaged with the engaging portion of the fastening member positioned below the upper exterior panel and a rear surface of a lower exterior panel is in contact with the lower supporting portion with an upper shiplap portion of an upper edge portion of the lower exterior panel engaged with the engaging portion of the fastening member positioned above the lower exterior panel.

12. An exterior panel fastening structure, comprising:
a plurality of fastening members as recited in claim 3 fixed to a fixing surface of a building frame side in multiple stages;
a plurality of exterior panels fastened using the fastening members in a state in which a rear surface of an upper exterior panel is in contact with the left supporting portion, the central supporting portion and the right supporting portion with a lower shiplap portion of a lower edge portion of the upper exterior panel engaged with the engaging portion of the fastening member positioned below the upper exterior panel and a rear surface of a lower exterior panel is in contact with the lower supporting portion with an upper shiplap portion of an upper edge portion of the lower exterior panel engaged with the engaging portion of the fastening member positioned above the lower exterior panel.

13. An exterior panel fastening structure, comprising:
a plurality of fastening members as recited in claim 7 fixed to a fixing surface of a building frame side in multiple stages;
a plurality of exterior panels fastened using the fastening members in a state in which a rear surface of an upper exterior panel is in contact with the left supporting portion, the central supporting portion and the right supporting portion with a lower shiplap portion of a lower edge portion of the upper exterior panel engaged with the engaging portion of the fastening member positioned below the upper exterior panel and a rear surface of a lower exterior panel is in contact with the lower supporting portion with an upper shiplap portion of an upper edge portion of the lower exterior panel engaged with the engaging portion of the fastening member positioned above the lower exterior panel.

14. An exterior panel fastening structure, comprising:
a plurality of fastening members as recited in claim 4 fixed to a fixing surface of a building frame side in multiple stages;
a plurality of exterior panels fastened using the fastening members in a state in which a rear surface of an upper exterior panel is in contact with the left supporting portion, the central supporting portion and the right supporting portion with a lower shiplap portion of a lower edge portion of the upper exterior panel engaged with the engaging portion of the fastening member positioned below the upper exterior panel and a rear surface of a lower exterior panel is in contact with the lower supporting portion with an upper shiplap portion of an upper edge portion of the lower exterior panel engaged with the engaging portion of the fastening member positioned above the lower exterior panel.

15. The fastening member as recited in claim 1, wherein each of the raised left and right side supporting portions and the raised lower side supporting portion have an outer side portion which extends downwardly from the respective raised left, right and lower side supporting portions.

16. A fastening member for fastening exterior panels, comprising:
raised left and fight side supporting portions having at least a raised side wall perpendicular to a front face of the fastening member, raised relative to an indented base plate portion, configured to be brought into contact with a rear surface of an upper exterior panel at the time of fastening the exterior panels;
the indented base plate portion located at an intermediate region between the raised left and fight side supporting portions and indented relative to the raised left and right side supporting portions, the indented base plate portion functioning as a fastening portion to a building frame side;
a raised central supporting portion, raised relative to the indented base plate portion, configured to be brought into contact with the rear surface of the upper exterior panel at the time of fastening the upper exterior panel, the raised central supporting portion being located between the raised left and fight side supporting portions and on one side of the indented base plate portion;
an engaging portion extended from a lower end of the raised central supporting portion, the engaging portion being configured to be engaged with upper and lower ends of upper and lower exterior panels at the time of fastening the exterior panels; and
a raised lower side supporting portion having at least a raised side wall facing perpendicular to the front face, raised relative to an indented base plate portion, configured to be brought into contact with a rear surface of a lower exterior panel at the time of fastening the lower exterior panel, the raised lower side supporting portion being located below the engaging portion,
wherein each of the raised left and right side supporting portions and the raised lower side supporting portion have an outer side portion which extends downwardly from the respective raised left, right and lower side supporting portions,
wherein the raised left, right, central and lower supporting portions define ridges connected in the center and lower part of the fastening member forming an unbroken surface connecting tops of the raised left, fight, central and lower supporting portions;
wherein the fastening member is formed of a single steel plate,
wherein the base plate portion is formed by denting the intermediate region of the steel plate between the raised left and right side supporting portions,
wherein the engaging portion is formed by cutting a part of a lower region of the steel plate and bending the cut portion frontward, and is provided with at least one cutout extending from a basal end of the engaging portion or its vicinity to a tip end of the engaging portion, and
wherein an upwardly extended portion is formed at a tip end of the engaging portion at one side of the cutout and a downwardly extended portion is formed at a tip end of the engaging portion at the other side of the cutout.

* * * * *